United States Patent Office 3,188,263
Patented June 8, 1965

3,188,263
HEAT STABILIZED VINYL PLASTIC COMPOSI-
TIONS, FLOOR TILES MADE THEREFROM, AND
METHODS FOR PREPARING SAME
Arthur E. Pflaumer, Norristown, Pa., assignor to R. T.
Vanderbilt Company, Inc., New York, N.Y., a corpo-
ration of New York
No Drawing. Filed Feb. 4, 1959, Ser. No. 791,056
The portion of the term of the patent subsequent to
Aug. 11, 1976, has been disclaimed
7 Claims. (Cl. 161—165)

This invention relates to vinyl plastic compositions, floor tiles made from such compositions, and methods which may be employed in making the plastic compositions and the floor tiles. More particularly, the invention is concerned with (1) plastic compositions which contain a major proportion of asbestos, along with a lesser quantity of vinyl chloride polymer as a binder material, and an amido compound to stabilize the polymer against discoloration and decomposition when subjected to elevated temperatures in the presence of the asbestos, (2) tiles made from such plastic compositions, and (3) methods for preparing such compositions and for fabricating the same into floor tiles.

FIELD OF INVENTION

Vinyl chloride polymers first began to assume importance as a commodity of commerce about thirty years ago. Since that time, they have been used in ever increasing quantities to make a host of different and varied products. Since price is an important factor in the growth of use of any commodity, as advanced technology has made it possible for the cost of vinyl resins to be reduced, the producers of the vinyl plastics have been able to further extend their markets and sales.

One of the important characteristics of vinyl chloride polymers which make them attractive for many uses is their high abrasive resistance. As a consequence, substantial quantities of these polymers are now employed for purposes where abrasion resistance is an important factor, e.g., shoe soles and heels, floor coverings, such as floor tile, luggage, furniture covering and similar upholstering material, and the like. However, the sale of products in most of these fields is highly competitive and even though a product may have some very outstanding property or characteristic, it still may not be used commercially if its cost is so high that other products, although not as well endowed with the desired characteristic or property, still possess it to a sufficient degree and are much less expensive. By way of example, in the floor covering field, vinyl plastic tiles are in competition with so-called asphalt tiles, rubber tiles, linoleum tiles, cork tiles, and the like. From the viewpoint of abrasion resistance, floor tiles made of vinyl plastics are probably superior to any other type of floor tile commercially available today. However, the tiles made from vinyl plastics, at the same time, are more expensive than some other types. Since purchasers of floor coverings may compromise between initial cost and ultimate life, they often buy and install floor tiles which will not last as long as vinyl plastic tiles, because of the price difference. In order to take advantage of the high abrasive resistance of the vinyl chloride polymers, and at the time reduce the cost of compositions based thereon which may be used to make floor tiles, the so-called "vinyl-asbestos" type of product has been developed. Thus, there are on the market today several basically different types of vinyl plastic floor tiles. The most expensive is the so-called "straight" vinyl tile, which contains a major portion of vinyl plastic, and only a minor portion of inert filling material and pigment. In contrast, there is the less expensive, so-called "vinyl-asbestos" type of tile, which contains a major portion of asbestos fibers, along with other inert, inorganic fillers, and a smaller proportion of vinyl chloride polymer as a binder for these asbestos fibers and inorganic fillers. This second type of product can be made and sold at a lower price than the so-called "straight vinyl" tile, and although the former type product has superior abrasive resistance, the latter tiles still have relatively good abrasive resistant qualities. Nevertheless, since cost continues to be a major factor in the floor finishing industry, extensive research and development work is being conducted in an attempt to lower the cost of all types of vinyl floor tiles by reducing the total cost of ingredients used in forming the tiles, and also by reducing the cost of processing the plastic compositions and fabricating the tiles therefrom.

Although, as pointed out above, vinyl chloride polymers possess a number of favorable and desirable properties, they have also suffered from having certain inherent undesirable characteristics, e.g., they will discolor and decompose when subjected to elevated temperatures. Thus, it is well known that vinyl chloride polymers tend to decompose and discolor when subjected to temperatures necessary to bring them into a plastic state so they can be milled and calendered as a step in forming them into sheets and other articles. This tendency to decompose or discolor is increased or accelerated in the presence of various substances. Asbestos is a particularly troublesome material, in this regard, for use as an ingredient in vinyl chloride polymer compositions. Thus, the compounding of asbestos with vinyl chloride polymers very strongly accentuates the heat decomposition and discoloration of vinyl chloride polymers and this effect is increased as the amount of asbestos in the compositions is increased.

Over the thirty or more years during which vinyl halide resins have been known and used, a great amount of work has been done to discover and develop stabilizing agents which may be added to the resins in order to prevent or mitigate the decomposition and discoloration of the resins when subjected to mechanical working at elevated temperatures. The soaps of heavy metals, such as lead, constitute one class of compounds which have been successfully used as stabilizing agents for vinyl halide polymers. As a matter of fact, probably every known general class of chemical compound has been tested for possible use as stabilizing agents for the vinyl halide resins. Among others, amido compounds have been indicated to be useful as stabilizers for vinyl halide resins, e.g., U.S. Patents 2,103,581, 2,654,680, 2,588,899, and 2,781,330. Also, U.S. 2,411,590 discloses that urea-formaldehyde resins and melamine-formaldehyde resins when incorporated in small amounts in certain vinyl chloride polymer compositions may improve the resistance of the compositions toward thermal decomposition.

Although extensive research and development work has been devoted to stabilizing agents and decomposition inhibitors for all types of plastic materials, including vinyl halide resins, knowledge about and use of such agents and inhibitors remains an empirical art and not a science. Thus, while it is found that small percentages of a certain substance will work satisfactorily under specific conditions to stabilize some vinyl chloride polymer compositions, for some unexplainable reason, the same substance will exhibit no stabilizing effect, or may even show an unstabilizing effect under other conditions, or in the presence of other additional components. By way of example, it has been found in the course of development of the invention described herein, that whereas some substances actually accelerate decomposition of vinyl chloride polymers when added in small amounts to an unfilled vinyl chloride polymer, these same compounds are capable of serving as very strong stabilizing agents when the polymers are compounded with a substantial quantity of asbestos.

The fabrication of flooring tiles containing a major portion of asbestos along with vinyl chloride polymers as binding agents, involves special problems because not only does the asbestos act so strongly to cause decomposition of the polymer binder but also due to the additional limitations upon stabilizing agents which may be successfully used in forming the floor tiles. Thus, some stabilizing agents known to be effective against the decomposition action of asbestos, such as barium laurate, cannot be successfully used in the fabrication of floor tiles from vinyl chloride polymers because the stabilizers may possess lubricating properties. This prevents the plastic compositions in which such lubricating stabilizers are incorporated from being satisfactorily calendered into sheets of the proper thickness to permit them to be cut into floor tiles. In other words, for a substance to be used successfully as a decomposition inhibitor in the formation of vinyl-asbestos floor tiles, not only must it exhibit stabilizing properties against asbestos, but must also meet other requirements, e.g., it must not exhibit any substantial lubricating qualities, when the plastic compositions containing it are subjected to milling and calendering.

OBJECTS

A principal object of this invention is the provision of new plastic compositions which contain a vinyl chloride polymer along with a major amount of asbestos, but which, in spite of the presence of the predominance of asbestos, may still be milled and calendered at elevated temperatures for an appreciable period of time without the polymer component of the plastic composition undergoing any substantial discoloration or other decomposition. Still further objects include:

(1) The provision of new methods for stabilizing vinyl chloride polymers which have been mixed with more than an equal weight of asbestos so that they may be milled and formed into floor tiles or similar sheet-like structures, without undergoing any substantial discoloration.

(2) The provision of new methods for compounding and fabricating vinyl chloride polymer compositions containing a major amount of asbestos, by adding thereto a small amount of certain nitrogenous compounds as stabilizing agents, and then subjecting the plastic composition to milling and calendering operations at elevated temperatures which, in the absence of the stabilizing agent, would cause the plastic composition to undergo undesirable discoloration and decomposition.

(3) The provision of plastic compositions which contain a vinyl chloride polymer that are capable of being milled and calendered into sheets to be formed into floor tiles, without rapid discoloration due to decomposition of the polymer component thereof, such compositions containing a major amount of asbestos, and a minor amount of a nitrogenous stabilizing agent which does not tend to lubricate the composition when mechanically worked on milling rolls or calendering rolls.

(4) The provision of new forms of heat stabilized vinyl plastic compositions specifically designed for fabrication into floor tiles.

(5) The provision of new vinyl-asbestos type floor covering tiles which possess unusually high stability against discoloration when subjected to elevated temperature conditions.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

GENERAL DESCRIPTION

The above stated objects are accomplished according to the present invention by forming plastic compositions from a major portion of asbestos and a lesser amount of a vinyl chloride polymer as a binder, and including therein as stabilizers to mitigate discoloration of the plastic compositions when subjected to mechanical working at elevated temperatures a material selected from the group consisting of bis alkylol ureas, bis alkylol ethylene ureas, polyalkylol melamines, heat-convertible polymers thereof, the lower alkyl ethers of said urea, ethylene urea or melamine derivatives and heat-convertible polymers of such ethers. The preferred stabilizers are those derived from urea and a lower alkyl aldehyde having the formula:

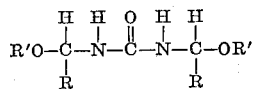

wherein R and R' are hydrogen radicals or lower alkyl radicals.

The method of compounding the new plastic compositions is not critical, provided that an amido stabilizing agent as defined above is substantially uniformly distributed throughout the plastic mass before the mass is subjected to any appreciable amount of mechanical working at elevated temperatures, i.e., temperatures above about 200° F. Thus, a critical step of the new procedures is the incorporation of between about 0.5 and 10% by weight, based upon the weight of vinyl chloride polymer in the composition, of the nitrogenous stabilizer in a composition comprising a major amount of asbestos and a lesser amount of a vinyl chloride polymer binder before any substantial discoloration of the plastic mass has occurred due to mechanical working at elevated temperatures. Thereafter, the plastic mass containing the nitrogenous stabilizing agent may be milled and calendered at elevated temperatures in order to form sheets or slabs thereof which may be cut into floor covering products such as floor tiles.

The success of the present invention is due in a large measure to the unique discovery that nitrogenous materials, as defined above, are uniquely effective in preventing discoloration of the asbestos-vinyl chloride polymer compositions used to form floor tiles when such compositions are mechanically worked at elevated temperatures than any other stabilizers known to date, but that these very same compounds, when added in the same quantities to the same plasticized vinyl chloride polymers or such polymers containing only minor percentages of fillers and/or pigments, but no asbestos, actually accelerate the decomposition of the polymers and discoloration thereof. This unusual and unexplainable difference in stabilizing activity of these nitrogenous materials with respect to plastic compositions containing a major portion of asbestos, in contrast to the unfilled or pure plasticized vinyl chloride polymers, has apparently prevented prior investigators of stabilizing agents from recognizing the very high effective stabilizing activity of these ureas in the asbestos-vinyl chloride polymer mixtures. Thus, it has been standard practice in the past for investigators of stabilizing agents to test the effectiveness of materials as stabilizing agents on the clear plasticized polymers, and it appears that this has prevented past investigators from appreciating the great usefulness of these ureas as heat stabilizing agents in the compounding of compositions containing a major portion of asbestos and a smaller portion of vinyl chloride polymer.

EXAMPLES

By way of further explanation of this invention, there are given below specific examples of the preparation of the new plastic compositions and floor tiles made therefrom. In these examples, all percentages and amounts or parts of ingredients are by weight unless otherwise specified.

Example I

Into a Banbury-type mixer equipped with a heating jacket, there are charged 200 parts of a copolymer of vinyl chloride and vinyl acetate containing about 85% vinyl chloride and 15% vinyl acetate, 360 parts of short fiber asbestos of the type used in the manufacture of floor covering tiles, 300 parts of whiting, 20 parts of epoxidized soy bean oil plasticizer, 60 parts of dioctyl phthalate, 50 parts of titanium dioxide pigment, and 10 parts of dimethylol urea. With the temperature of the Banbury mixer maintained in a range of 270 to 295° F., the ingredients are blended together in the mixer for about two minutes, and the resulting batch is then discharged from the mixer onto a roll mill of the rubber processing type. The roll mill is maintained at a temperature of approximately 260° F., and is associated with a set of calender rolls, so that the calender rolls continually withdraw a slab or blanket of the plastic composition from the nip between the rollers of the roll mill, while the remainder of the plastic mass which is maintained upon the mill rollers provides a source of supply to the calender rolls. The calender rolls are maintained at a temperature of approximately 200° F. and are adjusted to produce a continuous sheet having a thickness of about 3/16 inch. The roll mill and calender rolls are operated at such speed that the entire batch of plastic composition is processed into a calendered sheet in approximately 20 minutes.

As the calendered sheet emerges from the rolls, it is sliced by suitable cutters into individual sheets 36″ long, and these are then supported upon the upper surface of an endless conveyor belt and are passed in step-wise fashion between the heated platens of a hydraulic press. A continuous sheet of wax paper is also fed between the press platens, so that the sheet of wax paper comes between the top surface of the tiles and the bottom surface of the top platen to separate the tile from the platen when the press is closed. This pressing operation is carried out so that each sheet is pressed for about 15 seconds, at which time the conveyor belt moves a new sheet into the press and removes the press polished sheet from the press. As the press polished sheet is removed, the wax paper is drawn off its surface, leaving a smooth, polished and waxed surface thereon. Finally, the sheets are cut into longitudinal strips 9″ wide and these are then cut transversely by synchronized cutters into square tiles measuring 9″ on each side, using equipment and handling procedures well known in the floor covering tile industry for the formation of square flooring tiles. There are obtained by this operation 9 x 9″ polished floor tiles which possess a slightly grayish white color.

A group of the resulting tiles are applied to the surface of a kitchen floor by means of a rubber base adhesive using a standard tile installation procedure. The tile-covered floor is then subjected to walking wear, contact with soap and water, floor polishing machines and the like. It is found that the floor tiles perform satisfactorily, and do not exhibit any appreciable damage or discoloration due to abrasive wear, contact with water and similar liquids encountered in a household, or radiation by artificial or natural light.

Example II

Into a Banbury mixer which is heated by an external jacket to a temperature in the range of 270 to 295° F., there are charged 200 parts of a copolymer composed of 90% vinyl chloride, 10% vinyl acetate, 360 parts of short fiber asbestos, 300 parts of pulverulent calcium carbonate, 20 parts of epoxidized soy bean oil, 60 parts of dioctyl phthalate, and 50 parts of titanium dioxide pigment. This material is then blended for two minutes after which it is discharged from the Banbury mixer, thrown onto a rubber type roll mill where the mass is subjected at 290° F. to standard milling operation.

After five minutes, ten minutes, twenty minutes and thirty minutes, small sample slabs of the plastic mass are cut from the rolls. These are allowed to cool, and the color of the individual slabs is then compared. It is found that the slab cut at the end of five minutes has a very pale lavender color. The slab cut off at ten minutes is appreciably darker in color and tends more towards tan color than the slab cut at five minutes. Similarly, the sample cut at twenty minutes is still darker and possesses a very definite tan color. Finally, the sample cut at thirty minutes is highly colored as compared with the sample removed at five minutes and possesses a deep tan or caramel color.

Another batch, identical in composition to that just described above is put into the Banbury mixer and to it is added 5% by weight of pentaerythritol. The weight percentage of the pentaerythritol is based on the weight of the vinyl resin in the batch. These ingredients are blended together at 290° F. for approximately two minutes. The resulting batch is then discharged from the mixer onto a rubber mill operated as above described to provide separate sample slabs taken at five, ten, twenty and thirty minutes.

By using an identical procedure just described for the preparation of samples of plastic slabs containing 5% pentaerythritol, comparable samples for two, ten, twenty and thirty minute milling periods are prepared containing the following stabilizing agents in the indicated percentages:

|  | Percent |
| --- | --- |
| III. "Rhonite R-1" | 5 |
| IV. "Rhonite 610" | 5 |
| V. "Plaskon 3353" | 5 |
| VI. "Plaskon 3381" | 5 |
| VII. Pentaerythritol | 1 |
| VIII. "Rhonite 610" | 1 |

The percentages mentioned above are based on the weight of the vinyl polymer in the batch.

The product "Rhonite R-1" is a commercial grade of bis(hydroxy methyl) ethylene urea sold by Rohm and Haas Company.

The product "Rhonite 610" is a heat-convertible urea-formaldehyde resin sold by Rohm and Haas Company.

The product "Plaskon 3353" is a heat-convertible urea-formaldehyde resin sold by Allied Chemical and Dye Corp.

The product "Plaskon 3381" is a heat-convertible melamine-formaldehyde resin sold by Allied Chemical and Dye Corp.

Using the designation I for samples made with plastic composition containing no stabilizing agent, II for the samples made with 5% pentaerythritol as stabilizing agent, and the Roman numeral designations given in the above list for the remaining samples, the colors of the various sample slabs are compared in the following table:

TABLE I

| Composition | 5 min. | 10 min. | 20 min. | 30 min. |
| --- | --- | --- | --- | --- |
| I | 3 | 6 | 8 | 10 |
| II | 1 | 1 | 1 | 1 |
| III | 1 | 1 | 1 | 2 |
| IV | 1 | 1 | 1 | 1 |
| V | 1 | 1 | 1 | 1 |
| VI | 1 | 1 | 1 | 1 |
| VII | 3 | 4 | 5 | 6 |
| VIII | 2 | 2 | 3 | 4 |

In the above table, the figures running from 1 to 10, which appear in the columns headed "5 min.," "10 min.," "20 min.," and "30 min.," represent a proportional numerical measure of color intensity of the respective samples, the lightest of all of the samples being designated 1, and the darkest of the samples being designated 10, with the colors of the remaining samples being designated by numbers between these two extremes which are proportional in magnitude to the color intensity of the sample when viewed by reflected light in daylight.

These sample slabs of plastic composition demonstrate that the composition containing no stabilizing agent quickly begins to discolor when worked at 290° F. on a rubber mill, so that there is appreciable discoloration, even at the end of five minutes, and this rapidly increases in intensity as the time of milling increases. On the other hand, plastic compositions containing 5% pentaerythritol or 5% of the nitrogenous stabilizers of this invention are substantially stabilized against discoloration and exhibit substantially no change in color when milled at 290° F., even as long as thirty minutes. However, when the percentage of pentaerythritol is reduced to 1%, the color stability of the plastic composition is substantially less than the color stability of a composition containing only 1% "Rhonite 610."

*Example III*

Samples I to VI, as described in Example II and compared in Table I, are duplicated using one-half the amount of plasticizer and omitting asbestos, pigment and filler in the composition and sample slabs are taken after 30 minutes on the roll mill. Using the designation I for samples made with no stabilizing agent, the colors of the sample slabs are compared in the following table:

TABLE II

| Composition | Stabilizer | Color After 30 Minutes |
| --- | --- | --- |
| I | None | 3 |
| II | 5% pentaerythritol | 1 |
| III | 5% "Rhonite R-1" | 6 |
| IV | 5% "Rhonite 610" | 10 |
| V | 5% "Plaskon 3353" | 8 |
| VI | 5% "Plaskon 3381" | 8 |

In the above table, the figures running from 1 to 10 are used in the last column to designate proportional numerical measure of color intensity of the respective samples, the lightest of all being designated as 1 (off-white) and the darkest as 10 (caramel color).

Only slight discoloration resulted after milling the composition containing no stabilizer for thirty minutes; addition of pentaerythritol in 5% amounts prevented any discoloration whatever, while the other materials listed produce increased discoloraion. The discoloration increases as the amount of nitrogenous material is increased.

The results of this example demonstrate that not only are the nitrogenous-aldehyde derivatives ineffective as a heat stabilizing agent for the clear or unfilled vinyl chloride polymer, but they actually cause the polymer to decompose more rapidly than the pure or clear resin.

*Example IV*

A quantity of vinyl chloride polymer of a type referred to in the preceding examples is thrown onto a rubber mill, 5% by weight of calcium stearate is sprinkled onto the polymer mass, and with the rollers maintained at a temperature of 290° F., an attempt is made to mill the plastic mass using normal milling procedure. However, it is found that no satisfactory rolling and sheeting of the mass can be obtained because the added calcium stearate acts as a lubricant and prevents the polymer from adhering sufficiently to the mill rolls to enable the mass to be mechanically worked.

In another case, an attempt is made to mill a quantity of the same vinyl chloride polymer along with 5% by weight of barium laurate. Again, it is found that the mass cannot be satisfactorily worked on the mill rolls because of the lubricating effect of the added barium laurate.

DETAILED DESCRIPTION

On a weight basis, urea-formaldehyde condensation products, e.g., dimethylol urea, $C_1$ to $C_5$ alkoxy methyl urea, and the heat-convertible polymers thereof, appear to be the most effective for use as the stabilizing agents in accordance with this invention, and therefore, they are preferred materials for use in producing the new plastic compositions and floor tiles. However, other nitrogenous-aldehyde condensation products, as indicated above, may be used, and it has been found that one method of designating usable products of this type is that they shall be heat-convertible, i.e., capable of further polymerizing at elevated temperatures to form thermoset resinous products. Examples of other specific compounds which may be used as the stabilizing agents include dimethylol ethylene urea, hexamethylol melamine, tetramethylol melamine, the corresponding alkylol compounds made from acetaldehyde, propanal-1, butanal-1, and pentanal-1, the polyalkyl ethers formed by reaction of these polyalkylol compounds with $C_1$ to $C_5$ alkanols, e.g., methanol, ethanol, butanol-1, butanol-2, pentanol-1, or pentanol-2, and the heat-convertible polymers formed by polymerization of these compounds short of the thermoset stage. Some of the commercially available materials which may be used as the stabilizing agents in accordance with this invention have been listed in Example II above. Others include, triazine-formaldehyde resin such as "UF85" sold by Allied Chemical and Dye Corp., bis(methoxymethyl) uron, e.g., "Pryon A" sold by Warwick Chemical Co., and similar nitrogenous-aldehyde condensation products, commonly referred to as aminoplasts.

The stabilizing agent used in producing the new compositions may be a single compound or a mixture of nitrogenous materials.

Although the stabilizing agents above mentioned are usable in very small quantities in the vinyl-asbestos floor tile compositions, it is preferable that they be present in at least 0.5% by weight of the total composition. On the other hand, since large amounts will tend to embrittle the floor tiles, it is desirable to use no more than about 10% by weight of the vinyl resin content of the plastic composition or floor tile. Most satisfactory compositions, from the viewpoint of heat stability and flexibility, are those which are made with 1 to 5% by weight of the nitrogenous stabilizer by weight of the vinyl resin component of the plastic composition.

Another critical component of the new plastic compositions and floor tiles are vinyl chloride polymers. This includes solid polyvinyl chlorides of various molecular weights or degrees of polymerization and copolymers of vinyl chloride with other polymerizable materials which contain a predominant portion of vinyl chloride and a lesser portion of the other polymerizable material. Important examples of such copolymers are those made from 70 to 95% vinyl chloride and 5 to 30% vinyl acetate. The vinyl chloride polymer currently sold under the trade name "Bakelite Resin VYHH" by Carbide and Carbon Chemical Co. is an example of a commercially available polymer which can be used in the new stabilized plastic compositions.

Other usable resin binders for the new plastic compositions include copolymers of vinyl chloride with the following copolymerized materials: vinylidene chloride, vinyl acetate and diethyl maleate, styrene, styrene and vinyl acetate, maleic anhydride, acrylic acid esters, olefins, halogenated olefins, and comparable examples of usable vinyl chloride polymers such as disclosed in U.S. Patents 2,458,355; 2,462,422; 2,482,771; 2,496,384; 2,497,291; 2,532,727; 2,589,237; 2,563,459 and 2,568,692.

The vinyl chloride polymer component of the new plastic compositions and tiles may be present in varying amounts, but preferably should at least be 10% by weight of the total composition or tile, in order that the resulting floor tiles will possess sufficient abrasion resistance. On the other hand, for effective action of the new stabilizers, the vinyl chloride polymer content of the compositions should preferably not be more than about 40% by weight of the total composition.

Asbestos in substantial quantities appears to be a critical component of the new plastic compositions. Thus, as previously indicated, the specified agents are ineffective to stabilize the clear, plasticized vinyl chloride polymers against heat decomposition and, actually, have been found to accelerate such decomposition of the clear or unfilled polymers. Apparently, there is some unexplained co-operation between the asbestos and the stabilizing agent which creates the heat stabilizing effect when the vinyl chloride polymers are mixed with at least an equal part by weight of asbestos.

As is well known, asbestos comes in various size grades, as well as quality grades, the finer or shorter fiber length material being the type which is used in production of floor tiles because it is lower in cost. Type "7T06" asbestos sold by Johns-Manville Corporation is an example of asbestos particularly well suited for use in making the plastic compositions and floor tiles of this invention. For effective cooperation with the stabilizing agents, asbestos should be present in between about 30 and 60% by weight of the total composition, and preferably should be at least equal in weight to the quantity of vinyl chloride polymer in the compositions.

The new compositions may contain inorganic fillers or pigments in order to lower the total cost of the materials and to impart desired colors to the final products. Of course, inorganic fillers, i.e., pulverulent inorganic oxides, hydroxides, and water insoluble salts, which are used, should be substantially inert toward the vinyl chloride polymers. In other words, a filler should not be employed which tends to accelerate thermal decomposition of the polymers. A wide variety of usable inorganic fillers are well known to the plastics industry, and specific examples include: calcium carbonate (whiting, chalk), calcium sulfate (gypsum, terra alba), barium sulfate (barytes), magnesium carbonate, silica (quartz, clays), magnesium silicates (talc, soapstone and related minerals), kaolin and fire clays, mica, pumice, fly ash, titanium dioxide, carbon black, lead carbonate, lead chromate, mercury sulfide (cinnabar), lead oxide (litharge), lithopone and the like. The term "inorganic fillers" as used herein specifically excludes asbestos.

The inorganic fillers may be used in the new plastic compositions in varied amounts. For effectiveness in coloring the compositions, it is preferred that they be present in at least 10% by weight of the total composition, and in order that abrasion resistance of the resulting floor tiles will not be adversely affected, the inorganic filler content of the compositions should preferably not be over 40%.

Vinyl resin plasticizers are not a critical component of the new compositions because it is now possible to produce copolymers which are self-plasticizing or which require no plasticizer to be effective as binders for the other materials in these new tile compositions. However, advantageous use may be made of preferably between 5 and 20% by weight of the total composition of some plasticizer or mixture of plasticizers for vinyl chloride polymers. There is nothing critical about the particular compound or compounds used as plasticizers and dioctyl phthalate and epoxidized soy bean oil (a plasticizer sold by Rohm and Haas Company under the trade name "Plasticizer G62") are specific examples of usable materials. A whole host of other satisfactory plasticizers are well known to the plastics industry and some of these are specifically mentioned in the patents referred to hereinbefore.

Various extending agents or auxiliary binding materials may be incorporated in the new compositions in order to modify the hardness or other properties of the resulting compositions, and, principally, to reduce the material costs. The use of such ingredients in amounts between about 5 and 20% in floor tile compositions of the vinyl-asbestos type are well known by the trade, and examples of such auxiliary binders or extenders include, rosin, hydrogenated rosin, asphalt, factice, various gums, brittle unsaturated hydrocarbon resins, polyterpene resins, and the like.

Standard rubber or plastic working or fabricating apparatus and equipment can be employed in forming the new compositions of this invention and making floor tiles therefrom. The use of Banbury-type mixers and rolling mills have been referred to in the examples as equipment which can be employed in blending and mechanically working the compositions, and multi-roll calender equipment has been referred to as usable in forming the compositions into sheets from which floor tiles may be cut. Any other standard known equipment, however, may be employed in place of these specifically mentioned devices.

CONCLUSIONS

The foregoing specification describes new plastic compositions which employ vinyl chloride polymers as a binder for asbestos and other added ingredients which can be used in forming floor covering tiles or related products. The described compositions and floor tiles are unique because they incorporate small amounts of certain specified nitrogenous compound-aldehyde condensation products which have not been included heretofore in plastic compositions of this type. The new combination of the nitrogenous materials with the asbestos-vinyl plastic compositions creates very good stability in the compositions against discoloration or decomposition when subjected to mechanical working at elevated temperatures. These new heat stabilizing agents for this type of product are so effective that they can be used in relatively smaller amounts than previous known commercial stabilizing agents employed for the same type product. Furthermore, these agents are less expensive than prior commercially used stabilizing agents, so that the reduced quantity necessary and the reduced cost makes possible a very substantial reduction in the cost of the plastic compositions and the floor tiles prepared therefrom.

Having provided a complete description of the invention in such manner as to distinguish it from other inventions and from what is old, and having provided a description of the best mode contemplated of carrying out the invention, the scope of patent protection to be granted the invention is defined by the following claims.

I claim:

1. A milled and calendered floor tile having a thickness of $^3/_{16}$ in. and being substantially free from any discoloration which comprises 200 parts of a copolymer of 90% vinyl chloride and 10% vinyl acetate; 360 parts of short fiber asbestos; 300 parts of calcium carbonate; 20 parts of plasticizer; 50 parts of titanium dioxide pigment; and 10 parts of melamine formaldehyde condensate as a stabilizer.

2. A process for forming a floor tile having a thickness of $^3/_{16}$ in. and being substantially free from any discoloration which comprises incorporating 10 parts of melamine formaldehyde condensate as a stabilizer into 200 parts of a copolymer of 90% vinyl chloride and 10% vinyl acetate, 360 parts of short fiber asbestos, 300 parts of calcium carbonate, 20 parts of plasticizer, and 50 parts of titanium dioxide pigment; and milling and calendering subsequently to provide said floor tile.

3. A vinyl asbestos tile composition stabilized against discoloration by heat comprising a copolymer of 70% to 95% vinyl chloride and 30% to 5% vinyl acetate, at least an equal weight of asbestos fibers, 10% to 40% by weight of pulverulent inorganic filler and an amount up to 10% based on the weight of the copolymer of a stabilizer selected from the group consisting of bisalkylol ureas, bisalkylol ethylene ureas, polyalkylol melamine, heat-convertible polymers thereof, the lower alkylol ethers thereof, and heat-convertible polymers of said ethers wherein the alkylol groups contain 1 to 5 carbon atoms.

4. A vinyl asbestos tile composition stabilized against discoloration by heat comprising a copolymer of 70% to 95% by weight of vinyl chloride and 30% to 5% by weight of vinyl acetate, at least an equal weight of asbestos fibers, 10% to 40% by weight of pulverulent inorganic filler and an amount up to 10% based on the weight of copolymer of a material selected from compounds having the formula:

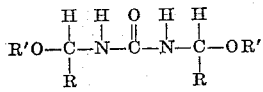

and heat-convertible polymers thereof, wherein R and R' are radicals selected from the group consisting of hydrogen and alkyl groups having 1 to 5 carbon atoms.

5. A vinyl asbestos tile composition stabilized against discoloration by heat which comprises 10% to 40% by weight of a copolymer containing 70% to 95% vinyl chloride and 30% to 5% vinyl acetate, 30% to 60% by weight of short, milled fibers of asbestos, 10% to 40% by weight of pulverulent inorganic filler, up to 20% by weight of vinyl resin plasticizer and 0.5% to 10% based on the weight of the copolymer of a material selected from the group consisting of dimethylol urea, the lower alkyl ethers of dimethylol urea and heat-convertible polymers thereof.

6. A vinyl asbestos tile composition stabilized against discoloration by heat comprising from about 10% to about 40% by weight of a copolymer containing from 70% to 95% vinyl chloride and from 30% to 5% vinyl acetate, 30% to 60% of short, milled fibers of asbestos, 10% to 50% by weight of pulverulent inorganic filler, up to 20% by weight of vinyl resin plasticizer and 0.5% to 10% based on the weight of the copolymer of a urea formaldehyde condensate.

7. A process for making vinyl asbestos tile stabilized against discoloration which comprises incorporating in a composition comprising a copolymer containing from about 70% to 95% vinyl chloride and from 30% to 5% vinyl acetate, at least an equal weight of fibers of asbestos, 10% to 40% by weight of pulverulent inorganic filler and from about 0.5% to about 10% based on the weight of the copolymer of a nitrogenous stabilizer and thereafter milling and calendering the mixture at elevated temperature to form floor tiles therefrom, said nitrogenous stabilizer being selected from compounds having the formula:

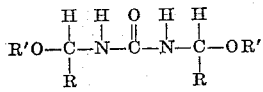

and heat-convertible polymers thereof where R and R' are radicals selected from the group consisting of hydrogen and alkyl groups having 1 to 5 carbon atoms.

References Cited by the Examiner
UNITED STATES PATENTS

| | | | |
|---|---|---|---|
| 2,343,997 | 3/44 | Powell et al. | 260—45 |
| 2,364,172 | 12/44 | Stauffer | 260—45 |
| 2,384,880 | 9/45 | Britton et al. | 260—45 |
| 2,581,908 | 1/52 | Kinzinger | 260—41 |
| 2,599,264 | 6/52 | Lawson | 260—41 |
| 2,899,398 | 8/58 | Pflaumer | 260—41 |
| 2,980,643 | 4/61 | Edelman et al. | 260—45 |

OTHER REFERENCES

Smith: "Vinyl Resins," Reinhold Publishing Company (1958), pp. 190–195.

MORRIS LIEBMAN, *Primary Examiner.*

DANIEL ARNOLD, ALLAN M. BOETTCHER, MILTON STERMAN, ALPHONSO D. SULLIVAN, *Examiners.*